Feb. 27, 1934.　　　　F. L. FLANDERS　　　　1,948,705
LOCK STRUCTURE
Filed Oct. 24, 1932
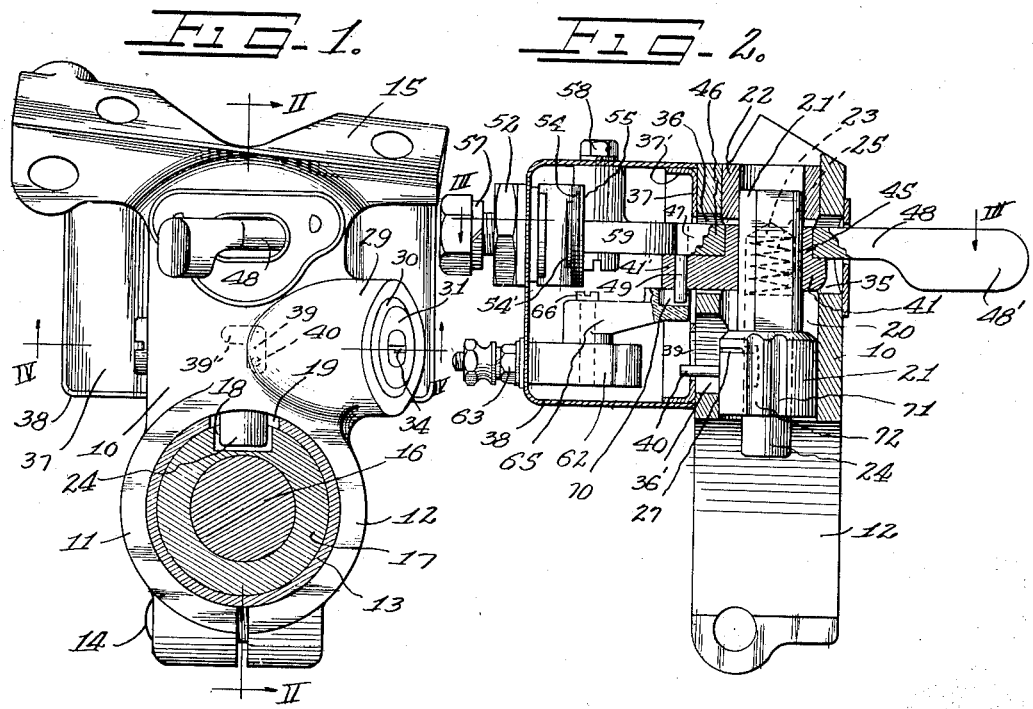
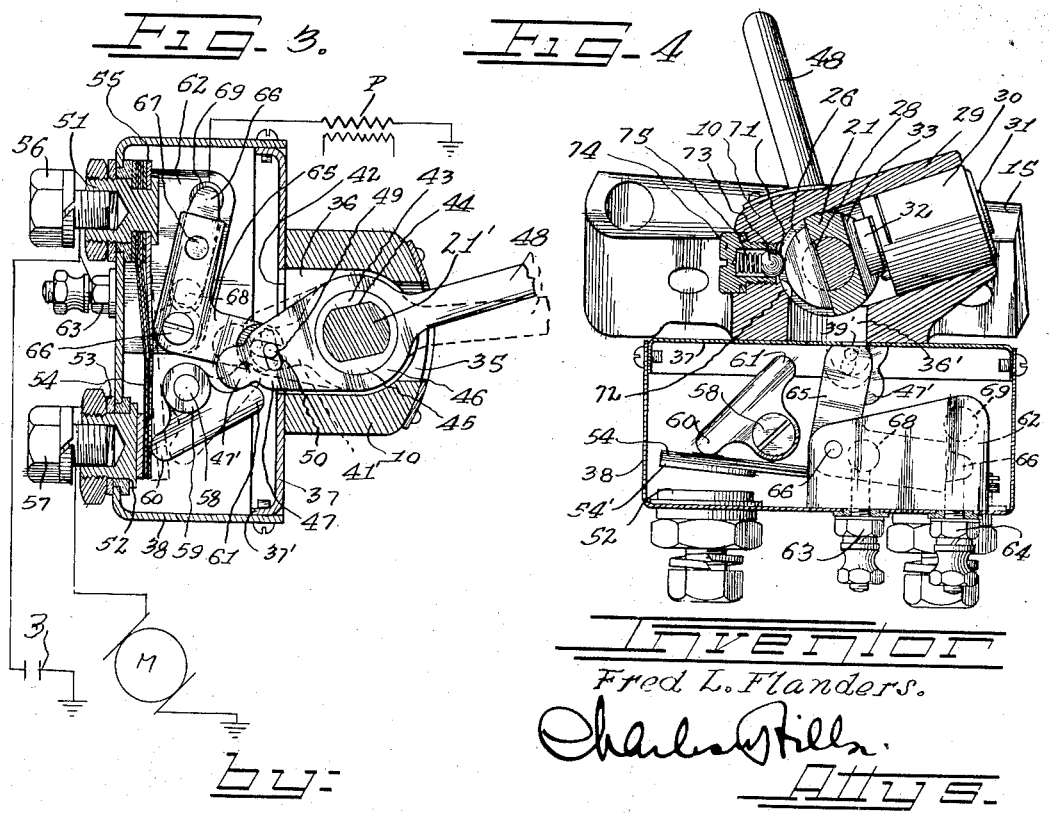
Inventor
Fred L. Flanders.
by Charles Hill
Attys.

Patented Feb. 27, 1934

1,948,705

UNITED STATES PATENT OFFICE 1,948,705

LOCK STRUCTURE

Fred L. Flanders, Spring Lake, Mich., assignor to Oakes Products Corporation, North Chicago, Ill., a corporation of Michigan Application October 24, 1932. Serial No. 639,222

11 Claims. (Cl. 70—127)

My invention relates to an improved unitary lock structure which is of particular utility in automotive vehicles for locking control elements such as the steering, ignition and starting elements.

An important object of the invention is to provide structure and arrangement involving a locking bolt element for locking and unlocking the steering, a switch element for controlling the ignition circuit and another switch element controlling the starting motor circuit, together with interlocking means between the elements whereby the functioning of certain elements is dependent upon the relative positions of the elements.

Another object of the invention is to provide a unitary lock structure in which key operable means are provided for moving the locking bolt to locking or unlocking position and a manually operable lever is provided and connected with the switch elements for operation of both of said switch elements or for operation of only one thereof, together with interlocking means whereby the operation of said switch elements or said locking bolt element is dependent upon the relative positions of such element.

A further object of the invention is to provide a simple, compact unitary lock structure which can be economically manufactured and which is durable and efficient.

The various features of construction, arrangement and operation of my invention are shown incorporated in the structure disclosed on the drawing, in which drawing Figure 1 is a plan view of the lock structure;

Figure 2 is a section on plane II—II, Figure 1;

Figure 3 is a section on plane III—III, Figure 2; and

Figure 4 is a section on plane IV—IV, Figure 1.

The lock structure shown comprises a body or housing 10 having at its outer end the semi-annular extensions 11 and 12 for receiving the steering column 13 of an automobile, the extensions being clamped around the column as by means of a bolt 14. At its inner end the body has the transversely extending flange 15 by means of which it may be secured to a suitable support as, for example, the dashboard of an automobile. Extending through the steering column is the steering shaft 16 which at its upper end terminates in the steering wheel (not shown) and on this shaft is secured a collar 17 having a locking notch 18 in one side thereof which is adapted to register with the hole 19 in the steering column when the steering wheel comes to a certain position, usually in position for straight forward travel of the automobile.

The body has the longitudinal cylindrical bore 20 which is concentric with the hole 19 through the steering column. Within the bore is the lock bolt structure comprising an outer part having the head 21 fitting in the bore and the reduced end 21' which at its rear end is guided by a bushing 22 secured in the end of the bore. Within the bolt structure body part is the axial pocket 23 for guiding the lock bolt or plunger 24, a spring 25 in the bottom of the pocket abutting the plunger and tending to shift it outwardly, the movement of the bolt being limited by a stop plate 26 extending through the transverse slot 27 into the slot 28 cut in the bolt.

A lateral projection 29 on the body 10 provides a cylindrical pocket for a lock cylinder 30 through which extends a lock barrel 31 having at its inner end a cam disc 32 whose center is at one side of the axis of the barrel. This cam disc extends into a slot or channel 33 formed in the head 21 of the lock bolt element, and upon the insertion of a suitable key in the keyhole 34 of the lock barrel the barrel may be turned to swing the cam disc 32 and to shift the lock bolt structure axially into locking or unlocking position, the movement of the disc being through 180° so that at the end of its movement the lock bolt element will be held axially in either its locking or unlocking position. When the lock bolt element is shifted forwardly, the bolt 24 will enter the hole 19 in the steering column, and if the notch 18 in the collar 17 on the steering shaft is in alignment with the hole 19 the bolt will enter the notch by force of the spring 25 and the steering shaft and column will be locked together so that the steering wheel cannot be turned.

At its front side the housing 10 has the passageway 35 and at its rear the housing has the passageway 36, these passageways being in alignment and communicating with the bore 20. Below the rear passageway 36 is the passageway 36' also communicating with the bore 20. Secured against the rear or back of the housing 10 over the passageways 36 and 36' is a plate 37 having the peripheral rearwardly extending flange 37' for receiving the rectangular cover structure or housing 38 which contains the switch elements. The plate 37 has a slot 39 extending parallel with the axis of the lock bolt structure 21, and from the inner end of this longitudinally extending slot, a slot 39' extends toward the left and at right angles to the slot 39, the slots being in register with the passageway 36' in the body 10.

Extending from the head 21 of the lock bolt structure is a pin 40 which, when the steering lock bolt structure is in its locking position, projects through the longitudinally extending slot 39 so that the lock bolt structure cannot be rotated, and which, when the lock bolt structure is in its unlocking position, is in alignment with the transverse slot 39' so that the lock bolt structure may then be rotated. Thus when the pin 40 projects through the longitudinal slot 39, the lock bolt structure may be shifted axially but cannot be rotated, and when the pin registers with the transverse slot 39' the lock bolt structure can be rotated, and when it has been rotated to swing the pin to the end of the transverse slot the lock bolt structure cannot be shifted axially until rotated back to bring the pin into alignment with the longitudinal slot 39.

The lever arm 41' extends from the hub 41 which is within the bore 10 and which receives the reduced end 21' of the lock bolt structure, the lever arm projecting into the housing 38 through the passageway 42 in the plate 37. The lever hub 41 is restrained against axial movement by the bushing 22 and the bottom wall of the passageways 35 and 36 and is connected with the reduced end 21' of the lock bolt structure so that when rotated the lock bolt structure will rotate therewith. As shown the hub 41 has key extensions 43 engaging the flat sides 44 of the bolt end 21'. The lock bolt structure can thus be shifted axially independently of the lever hub 41 but must rotate therewith.

The lever hub 41 has the reduced cylindrical part 45 supporting and fulcruming the hub 46. The lever arm 47 extends rearwardly from the hub 46, through the opening 42 in the plate 37 and into the housing 38, and a lever arm 48 extends forwardly from the hub 46 through the passageway 35 in the body 10, the lever arm 48 having the flattened outer end 48' whereby it may be readily engaged by the fingers for manual operation.

A pin 49 extends transversely through the end of the lever arm 41', one end of the pin projecting into an elongated slot 50 in the lever arm 47 so that this lever arm may have swinging movement independently of the lever arm 41' to the extent of the length of the slot.

Secured to the rear wall of the housing 38 are the circuit terminals 51 and 52 which are insulated from the housing by suitable insulation 53. The terminal 51 carries a contact bar 54 which extends toward the terminal 52 and carries a contact plate 54' for electrically engaging the terminal 52. A spring 55 is anchored at one end to the terminal 51 behind the switch bar and tends to swing the switch bar to hold the contact plate 54' away from the terminal 52. Binding posts 56 and 57 serve to secure current conductors to the terminals.

A post 58 extending inwardly from the side wall of the housing 38 supports a T-shaped cam lever 59 whose arms or ends 60 and 61 are adapted respectively for engagement with the end of the switch bar 54 and with the cylindrical end 47' on lever arm 47. When the lever arm 48 is swung manually its full distance toward the right the end 47' will engage with the cam lever to rock it on the post 58 and to apply its end 60 against the free end of the switch bar to swing the bar against the resistance of the spring 55 to apply the contact plate 54' to the terminal 52 to thus establish electrical connection between the terminals 51 and 52. When the lever arm 48 is released the force of the spring 55 will rock the cam lever and will swing the lever structure 46 back to an intermediate position, as shown in dotted lines in Figure 3.

Describing now the ignition switch mechanism, a block 62 of insulating material extends forwardly from and is secured to the rear wall of the housing 38 by terminal posts 63 and 64 which are insulated from the housing. An L-shaped switch lever 65 is pivoted at its corner on the block 62 by a screw or post 66, the lever being preferably of insulating material. The upstanding arm of the switch lever carries a switch blade 66 secured to the lever intermediate its ends as by a rivet 67, and the ends of this switch blade are adapted to engage with contacts 68 and 69 respectively, which contacts are mounted on the block 62 and electrically connected with the terminal posts 63 and 64 respectively. The forwardly extending leg of the switch lever has in its end a slot 70 to receive the projecting end of the pin 49 carried by the lever arm 41' whose other end extends into the slot 50 of the lever arm 47 as has already been explained. With this arrangement, when the lever arm 48 is manually swung, the switch lever will be swung to carry its switch blade 66 into or out of engagement with the contact 68 and 69. When the lever arm 48 is swung to the extreme left position the switch lever will be in position to disconnect the switch blade from the contacts and when the lever arm 48 has been swung the full distance to the right, as shown in full lines in Figure 3, the switch lever will carry its switch blade away from the contacts. When the manually operable lever arm 48 is swung to the extreme left, one end of the slot 50 of the lever arm 47 engages the pin 49 and the ignition switch is moved to open position and the cam lever 59 is released from the end of the lever arm 47 and the starting switch is opened. When the lever arm 48 is swung to the extreme right position, the other end of the slot 50 engages with the pin 49 and the ignition switch is moved to closed position, and at the same time the cam lever 59 is rotated to close the starting switch. If the lever arm 48 is now released, the force of the spring 55 will open the starting switch and swing the lever arm 48 back to an intermediate position, the distance of this back movement being the extent of the slot 50. The starting switch will then be open but the ignition switch will still remain closed. The lever arm 48 may then be swung back and forth to either its intermediate position or its final position toward the right to cause opening or closing of the starting switch independently of movement of the ignition switch.

Braking means are preferably provided for yieldably holding the ignition switch in open or closed position. As shown the head 21 of the locking bolt structure has longitudinally extending grooves 71 and 72 for cooperation with a ball 73 which is contained within a plug 74 and is pressed toward the lock bolt by a spring 75, the plug being threaded into a suitable threaded opening in the lock body 10, all as clearly shown in Figure 4. When the lever arm 48 is swung to its extreme left position, the ball will be in engagement in the groove 71 and will tend to hold the lever structure in this position with the switch open. When the lever arm 48 has been swung to its extreme right position, the ball 73 will be in engagement in the groove 72 and will tend to hold the lock bolt against rotation and thereby yieldably hold the lever arm 41' and the ignition switch in switch closing position, it being remembered that the hub 41 of the lever arm 41' is keyed to the lock bolt structure. The engagement of the ball 73 in the groove 72 will thus hold the ignition switch closed during independent movement of the lever arm 48 for opening or closure of the starting switch.

On Figure 3 I have shown a circuit arrangement for the lock structure. The terminal 51 is connected with the positive terminal of the battery B whose other terminal is grounded, the battery being also connected with the terminal post 63 of the ignition switch mechanism. The other terminal 52 of the starting switch is connected directly with one terminal of the starting motor M whose other terminal is grounded. The ignition switch terminal post 64 and the contact 69 are connected with one terminal of the primary winding P of an ignition coil whose other terminal is grounded. Where the starting motor circuit is to be directly controlled, the starting switch terminals and blade will be heavier in order to be of sufficient current carrying capacity. However, it is evident that instead of directly connecting the starting motor in circuit the starting switch may control the circuit for a relay which in turn controls the starting motor circuit and in that case the starting switch parts can be made much lighter.

Describing now the operation, the normal position of the lock structure is shown in Figures 1, 2 and 4, in which condition both switches are open and the lock bolt structure is in its locking position to prevent rotation of the steering column, the pin 40 on the lock bolt structure projecting through the longitudinal slot 39 in the plate 37 so that in the normal condition of the parts it will be impossible to swing the lever arm 48 to operate the switches.

The operator now inserts a suitable key in the lock barrel 31 and turns the key to shift the lock bolt structure inwardly to unlock the steering column, the pin 40 then coming into register with the transverse slot 39' so that the bolt structure will be free to rotate. He then swings the lever arm 48 the entire distance to the right to close both the ignition switch and the starting switch so that the ignition system and the starting motor are supplied with current from the battery and as soon as the engine has been started he will release the lever arm 48 for opening of the starting switch, the lock bolt being yieldably held in position by engagement of the ball 73 in the groove 72 and the ignition switch will be held in closed position for running of the engine. Should the engine accidentally stop the operator merely swings the lever arm 48 from its intermediate position back to its extreme position to the right to cause closure of the starting switch. If it is desired to stop the engine, the lever arm 48 is swung to its extreme left position to open the ignition switch and the lock bolt and switch will then be held yieldably in position by engagement of the ball 73 in the groove 71. In this position, the pin 40 will again be in registration with the longitudinal slot 39 and the key may be turned to shift the bolt structure outwardly to its locking position. When the bolt is in unlocking position and the ignition switch is closed, the pin 40 will be in the transverse slot 39' and the lock bolt cannot be shifted back to locking position until the ignition switch has been opened. The interlocking connection between the lock bolt and switch elements thus makes the functioning of one element dependent upon the relative positions of the elements and it will be impossible to operate the circuit controlling element when the steering is locked, or to relock the steering when the circuit controlling elements are in circuit closing position.

I thus produce a compact and efficient unitary structure for controlling and locking the steering, ignition and starting in a motor vehicle. I do not desire to be limited to the exact construction, arrangement and operation shown and described as changes and modifications may be made without departing from the scope and spirit of the invention as defined in the appended claims.

I claim as my invention:

1. A combined starting and ignition switch structure comprising a starting switch and an ignition switch, a manually operable actuating lever for said switches, means operable to close both switches when said lever is shifted in one direction, a lost motion connection between said lever and ignition switch permitting partial return movement of said lever to release only said starting switch, a shiftable fulcrum shaft for said lever, and locking means controlled by the shifting of said shaft for locking said lever against rotation.

2. A lock structure for automotive vehicles in which is combined a locking bolt, an ignition switch and a starting switch, means for shifting said bolt to locking or unlocking position, a first lever and a second lever, said second lever being manually operable, means connecting said first lever with said ignition switch for operation of said switch when said lever is swung, means for connecting said second lever with said starting switch for operation of said switch when said lever is swung, a connection between said levers for transmitting swinging movement of said second lever to said first lever whereby both switches may be simultaneously closed, said connection having sufficient lost motion to permit partial return movement of said second lever for release of said starting switch to open position without opening said ignition switch, and means controlled by the movement of said locking bolt for locking said levers against swing when said bolt is in locking position.

3. A unitary lock structure in which is combined a locking bolt for the steering apparatus of an automotive vehicle, an ignition switch for the ignition circuit and a starting switch for controlling the starting motor circuit, means for shifting said bolt to and locking it in steering locking or unlocking position, a manually operable actuating member, transmission means between said actuating member and said switches adapted upon movement of said actuating member to one position to cause closure of said switches, said transmission means between said actuating member and said ignition switch including a lost motion connection permitting partial return movement of said actuating member for opening of said starting switch without opening said ignition switch, and means controlled by the movement of said bolt for locking said actuating member against switch operating movement when said steering locking bolt is in locking position.

4. A unitary lock structure in which is combined a locking bolt for the steering apparatus of an automotive vehicle, an ignition switch for the ignition circuit and a starting switch for controlling the starting motor circuit, means for shifting said bolt to and locking it in steering locking or unlocking position, a manually operable actuating member, transmission means between said actuating member and said switches adapted upon movement of said actuating member to one position to cause closure of said switches, said transmission means between said actuating member and said ignition switch including a lost motion connection permitting partial return movement of said actuating member for opening of said starting switch without opening said ignition switch, means locking said actuating member against switch operating movement when said locking bolt is in steering locking position, and means locking said bolt against shifting movement when said actuating member is in switch closing position.

5. A combined starting and ignition switch structure comprising a starting switch and an ignition switch, a first lever and a second lever, said second lever being manually operable, means connecting said first lever with said ignition switch for operation of said switch when said lever is swung, means for connecting said second lever with said starting switch for operation of said switch when said lever is swung, a movement transmitting connection between said levers for transmitting swinging movement of said second lever to said first lever whereby both switches may be simultaneously closed, said connection having sufficient lost motion to permit partial return movement of said second lever for release of said starting switch to open position without opening said ignition switch.

6. In combination, a rotatable actuating member, a first switch directly operable by said member, a lever fulcrumed on said actuating member, a second switch directly operable by said lever, a connection between said lever and actuating member for causing rotation of said actuating member with said lever for operation of both said switches, said connection having lost motion for permitting independent movement of said lever, a supporting shaft for said actuating member secured to rotate therewith, and means for locking said shaft against rotation to thereby prevent operation of said switches.

7. In combination, a rotatable actuating member, a switch operable directly by said member, a lever fulcrumed on said member, a second switch directly operable by said lever, a connection between said lever and actuating member for causing rotation of said member with said lever for simultaneous operation of both switches, said connection having lost motion permitting independent movement of said lever, a locking bolt forming a fulcrum support for said actuating member and being axially shiftable relative thereto, a control to be locked, and means for shifting said bolt to locking or unlocking position relative to said control.

8. In combination, a rotatable actuating member, a switch directly operable by said member, a lever fulcrumed on said member, a second switch directly operable by said lever, a lost motion connection between said lever and actuating member operable to cause rotation of said member with said lever for operation of both switches but permitting independent movement of said lever and the switch controlled thereby, a bolt forming a fulcrum support for said actuating member, said bolt being keyed to said member to rotate therewith but being axially shiftable relative thereto, a control to be locked, means for shifting said bolt to lock or unlock said control, and means preventing rotation of said bolt and operation of said switches when said control is locked.

9. In combination, a rotatable actuating member, a switch operable by said member, a lever fulcrumed on said member, a second switch connected to be operated by said lever, a lost motion connection between said lever and actuating member for causing rotation of said member with said lever for operation of both switches but permitting movement of said lever and operation of said second switch, a control to be locked, and means adapted in one position to lock said control and prevent rotation of said actuating member and in another position to unlock said control and release said actuating member for rotation and switch operation.

10. In combination, a first lever and a second lever, said levers being concentrically fulcrumed and said first lever being manually operable, a first switch directly operable by said first lever, a second switch directly operable by said second lever, a connection between said levers causing operation of said second switch by said second lever, when said first lever is manually operated to operate said first switch, said connection having lost motion for permitting limited reverse movement of said first lever independently of movement of said second lever.

11. A combined starting and ignition switch structure comprising a first lever and a second lever, said levers being concentrically fulcrumed and said first lever being manually operable, a starting switch adapted to be moved to closed position when said first lever is manually moved its full distance in one direction, an ignition switch operable by said second lever, a movement transmitting connection between said levers operable to cause closure of said ignition switch by said second lever when said first lever is moved full distance to cause closure of the starting switch, said connection having sufficient lost motion to permit limited reverse movement of said first lever for opening of the starting switch without causing movement of said second lever.

FRED L. FLANDERS.